(12) United States Patent
Guo et al.

(10) Patent No.: US 11,816,787 B2
(45) Date of Patent: Nov. 14, 2023

(54) METHOD FOR REPRESENTING AN ENVIRONMENTAL REGION OF A MOTOR VEHICLE WITH VIRTUAL, ELONGATED DISTANCE MARKERS IN AN IMAGE, COMPUTER PROGRAM PRODUCT AS WELL AS DISPLAY SYSTEM

(71) Applicant: CONNAUGHT ELECTRONICS LTD., Tuam (IE)

(72) Inventors: Huanqing Guo, Galway (IE); Fergal O'Malley, Galway (IE); Guenter Bauer, Petershausen (DE); Felix Ruhl, Müchen (DE)

(73) Assignee: Connaught Electronics Ltd., Galway (IE)

( * ) Notice: Subject to any disclaimer, the term of this patent is extended or adjusted under 35 U.S.C. 154(b) by 0 days.

(21) Appl. No.: 16/965,167

(22) PCT Filed: Jan. 10, 2019

(86) PCT No.: PCT/EP2019/050583
§ 371 (c)(1),
(2) Date: Jul. 27, 2020

(87) PCT Pub. No.: WO2019/149497
PCT Pub. Date: Aug. 8, 2019

(65) Prior Publication Data
US 2021/0125401 A1 Apr. 29, 2021

(30) Foreign Application Priority Data
Jan. 30, 2018 (DE) .................... 10 2018 102 047.3

(51) Int. Cl.
*G06T 15/20* (2011.01)
*G06T 19/00* (2011.01)

(52) U.S. Cl.
CPC ............ *G06T 15/205* (2013.01); *G06T 19/00* (2013.01); *G06T 19/006* (2013.01); *G06T 2215/12* (2013.01); *G06T 2219/012* (2013.01)

(58) Field of Classification Search
None
See application file for complete search history.

(56) References Cited

U.S. PATENT DOCUMENTS 9,679,359 B2 * 6/2017 Huebner .................. B60R 1/00
10,692,173 B2   6/2020 Scholl
(Continued)

FOREIGN PATENT DOCUMENTS

DE  102013013364   3/2014
JP     07192199     7/1995
(Continued)

OTHER PUBLICATIONS

Yi Gao, Chunyu Lin, Yao Zhao, Xin Wang, Shikui Wei, Qi Huang, "3-D Surround View for Advanced Driver Assistance Systems", 2018, IEEE Transactions on Intelligent Transportation Systems, 19(1):320-328 (Year: 2018).*
(Continued)

*Primary Examiner* — Michael J Cobb
(74) *Attorney, Agent, or Firm* — Fitch, Even, Tabin & Flannery, LLP

(57) ABSTRACT

The invention relates to a method for representing an environmental region of a motor vehicle in an image, in which real images of the environmental region are captured by a plurality of real cameras of the motor vehicle and the image is generated from these real images, which at least partially represents the environmental region, wherein the image is represented from a perspective of a virtual camera arranged in the environmental region, and the image is generated as a bowl shape, wherein at least one virtual
(Continued)

Figure 1:
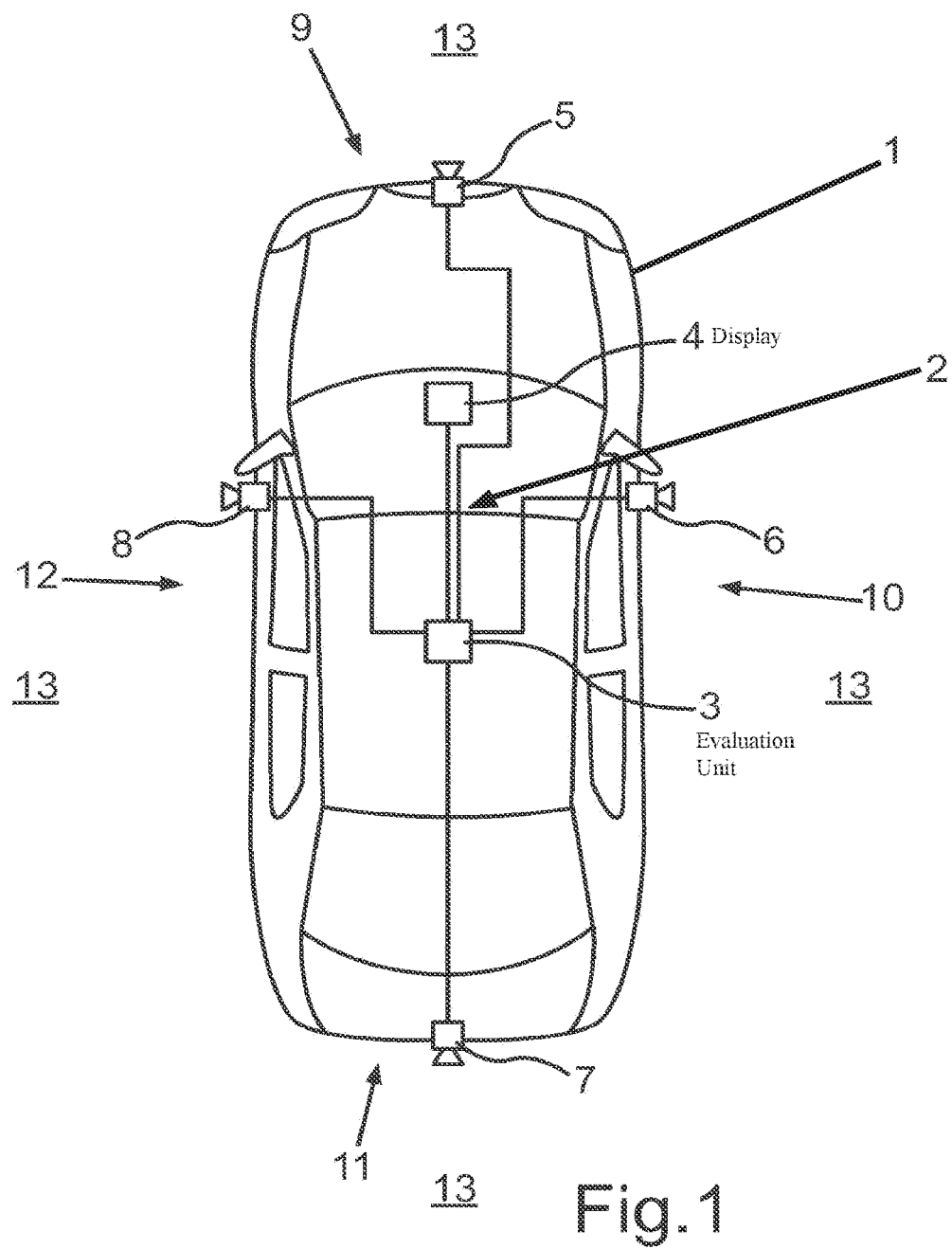

elongated distance marker is represented in the image, by which a distance to the motor vehicle is symbolized in the virtual bowl shape. The invention also relates to a computer program product and a display system for a motor vehicle.

17 Claims, 3 Drawing Sheets

(56) References Cited

U.S. PATENT DOCUMENTS

| | | | | |
|---|---|---|---|---|
| 2009/0122140 | A1* | 5/2009 | Imamura | G06T 7/74 |
| | | | | 348/148 |
| 2011/0032357 | A1 | 2/2011 | Kitaura | |
| 2013/0194256 | A1* | 8/2013 | Gassmann | G08G 1/163 |
| | | | | 345/419 |
| 2014/0055487 | A1* | 2/2014 | Kiyo | B60R 1/00 |
| | | | | 345/629 |
| 2014/0112597 | A1* | 4/2014 | Yu | G06V 10/24 |
| | | | | 382/294 |
| 2016/0088260 | A1* | 3/2016 | Fujio | H04N 7/181 |
| | | | | 348/148 |
| 2017/0109940 | A1* | 4/2017 | Guo | G06T 7/30 |
| 2017/0277961 | A1* | 9/2017 | Kuehnle | G06T 3/4038 |
| 2018/0058882 | A1* | 3/2018 | Hodohara | G01C 25/005 |
| 2019/0026557 | A1* | 1/2019 | Watanabe | G06V 20/20 |
| 2019/0164333 | A1* | 5/2019 | Fukushima | B60R 1/002 |
| 2019/0295291 | A1* | 9/2019 | Raag | G06T 7/85 |
| 2019/0370572 | A1* | 12/2019 | Nagpal | G06T 7/62 |
| 2020/0098164 | A1* | 3/2020 | Bruns | G06T 15/503 |
| 2020/0257909 | A1* | 8/2020 | Korman | G08G 1/143 |
| 2022/0084246 | A1* | 3/2022 | Dai | G06T 3/60 |
| 2022/0254108 | A1* | 8/2022 | Cower | G06T 15/20 |

FOREIGN PATENT DOCUMENTS

| | | |
|---|---|---|
| JP | 200323623 | 1/2003 |
| JP | 2012001126 | 1/2012 |
| JP | 2013113044 | 6/2013 |
| JP | 2014129093 | 7/2014 |
| JP | 201663390 | 4/2016 |
| KR | 20160072190 | 6/2016 |

OTHER PUBLICATIONS

Seiya Shimizu Jun Kawai Hiroshi Yamada, "Wraparound View System for Motor Vehicles", 2010, Fujitsu Science and Technology Journal, 46(1):95-102 (Year: 2010).*
Vikram Appia et al. "Surround View Camera System for ADAS on TI's TDAx SoCs", 2015, Texas Instrument, retrieved from "https://www.ti.com/lit/wp/spry270a/spry270a.pdf?ts=1688238274162" (Year: 2015).*
Abdulrahman S. Alturki, "Principal Point Determination for Camera Calibration", 2017, PhD Dissertation, University of Dayton, Dayton, Ohio (Year: 2017).*
Gopi K. Tummala, "Automatic Camera Calibration Techniques for Collaborative Vehicular Applications", 2019, PhD Dissertation, The Ohio State University, Columbus, Ohio (Year: 2019).*
Patent Cooperation Treaty, International Bureau, Notification Concerning Transmittal of International Preliminary Report on Patentability (Chapter I of the Patent Cooperation Treaty) and Written Opinion of the International Searching Authority, received in International Application No. PCT/EP2019/050583, dated Aug. 4, 2020, 7 pp.
Fujitsu, "360 degree Wrap-Around Video Imagine Technology ready for Integration with Fujitsu Graphics SoCs", Jan. 1, 2014, 7 pp.
Kazuhiro Sakiyama et al: "Parking Assist System", Fujitsu Ten Tech. M., No. 15, Jan. 1, 2000, 7 pp.
Patent Cooperation Treaty, International Searching Authority, Notificaiton of Transmittal of the International Search Report and Written Opinion of the International Searching Authority, or the Delcaration received in International Application No. PCT/EP2019/050583, dated Mar. 14, 2019, 13 pp.
Ruimin Ke et al: "Roadway surveillance video camera calibration using standard shipping container", 2017 International Smart Cities Conference (ISC2), Sep. 1, 2017, 6 pp.
Japan Patent Office, Office Action issued in Japanese Patent Application No. 2020-541759, dated Aug. 26, 2021, 13 pp.
Japan Patent Office, Office Action (Notice of Reasons for Refusal) issued in Japanese Patent Application No. 2020-541759, dated Jan. 28, 2022, 10 pp.
Korean Patent Office, Office Action issued in Korean Application No. 10-2020-7024792, dated Feb. 15, 2022, 5 pp.
Japan Patent Office, Office Action (Decision of Refusal) issued in Japanese Patent Application No. 2020-541759, dated Sep. 28, 2022, 5 pp.
Korean Patent Office, Office Action issued in Korean Application No. 9-5-2022-082116794, dated Oct. 26, 2022, 6 pp.
Korean Intellectual Property Office, Office Action issued in Korean Application No. 10-2023-7016329, dated Jun. 23, 2023, 10 pp.

* cited by examiner

METHOD FOR REPRESENTING AN ENVIRONMENTAL REGION OF A MOTOR VEHICLE WITH VIRTUAL, ELONGATED DISTANCE MARKERS IN AN IMAGE, COMPUTER PROGRAM PRODUCT AS WELL AS DISPLAY SYSTEM

CROSS-REFERENCE TO RELATED APPLICATIONS

This application is a U.S. national phase application filed under 35 U.S.C. § 371 of International Application PCT/EP2019/050583, filed Jan. 10, 2019, designating the United States, which claims the benefit of German Patent Application 10 2018 102 047.3, filed Jan. 30, 2018, both of which are hereby incorporated herein by reference in their entirety.

The invention relates to a method for representing an environmental region of a motor vehicle in an image. Real images of the environmental region are captured by a plurality of real cameras of the motor vehicle and the image is generated from these real images, which at least partially represents the environmental region. The image is represented from a perspective of a virtual camera arranged in the environmental region. The image is generated and represented, respectively, in a bowl shape. This means that the image is generated and represented in a specific "distorted" or curved representation.

Furthermore, methods for transforming an image are known, in which an environmental region of a motor vehicle is at least partially represented by the image from the perspective of a virtual camera virtually arranged in the environmental region, are known from the prior art.

Thus, in DE 10 2013 013 364 A1, a method for low-distortion imaging environmental image data is provided, which is generated by a plurality of cameras, which are arranged at a motor vehicle.

Furthermore, an image processing device is described in US 2011/0032357 A1, by which an image of an environmental region of a motor vehicle is captured. The captured image is converted to an image, which is viewed from the perspective of a virtual line of sight. The virtual line of sight extends from a predetermined position in the environmental region into a predetermined direction.

Furthermore, it is known that an image is provided by a virtual camera. Then, the virtual camera can usually be arbitrarily arranged around a motor vehicle in fictive manner. The image is provided by transforming real images. The real images are usually provided by a plurality of real cameras of the motor vehicle. By the plurality of the real cameras, an environmental region of the motor vehicle is usually completely captured. The real images can be selected and transformed by the virtual camera such that the image is provided from the perspective of the virtual camera. Thus, the virtual camera in the environmental region of the motor vehicle is not really existing, but describes the transformation and selection of the real images such that the desired perspective of the virtual camera is shown by the image. Usually, the provision of the image is determined by a transformation, which includes a translation and multiple rotations. Thus, each of the real images is for example transformed from a camera coordinate system of the respective real camera into a motor vehicle coordinate system, and the position of the virtual camera can finally be set in the motor vehicle coordinate system.

Especially in representations of images in such a bowl shape, the fact occurs due to the curvature of the image view that exact positions and thus distances to the motor vehicle can no longer be accurately recognized and estimated.

It is the object of the present invention to provide a method for representing an environmental region of a motor vehicle in an image, in which the image is generated in a bowl shape and positions in the environmental region to the motor vehicle can be recognized and estimated in improved manner. Furthermore, it is the object to provide a computer program product as well as a display system for a motor vehicle.

An aspect of the invention relates to a method for representing an environmental region of a motor vehicle, wherein the representation is effected in an image. In the method, capturing multiple real images of the environmental region is performed by a plurality of real cameras of the motor vehicle. The image, which can then also be referred to as an overall image, is then generated from these real images. Therefore, this then common image is generated from a plurality of real images. The environmental region is at least partially represented in this image. The image is represented from a perspective of a virtual camera arranged in the environmental region. The image is generated and represented as a bowl shape and thus with a curved image plane.

At least one virtual, elongated distance marker is represented in the image, by which a distance between positions in the environmental region to the motor vehicle is symbolized in the virtual bowl shape. Thereby, it becomes simpler for an observer of the image to be able to better recognize and estimate distances of positions in the environmental region represented curved by the bowl shape. A real distance of specific positions in the environmental region to the motor vehicle can be recognized in intuitively improved manner even if this curved representation is shown in the image and positions to each other can thus also be estimated in improved manner.

Since a distance of positions to each other and/or a position to a motor vehicle is different in this image with the bowl shape than in a plane representation of the environmental region in an image, this display of at least one virtual elongated distance marker is also very helpful for the observer of this image.

By also not only representing a general distance marker such as for example a point, but an elongated distance marker, the distance to the motor vehicle is also more extensively and even better comprehensibly symbolized by such a line. By such an elongated distance marker, a very delicate and virtual element is also represented, which does not entail an extensive coverage of the image especially in such a curved image representation as it occurs by a bowl shape, such that a more accurate association then in turn would not be possible, but a very delicate virtual element is shown in this context, in particular overlaid, such that an extensive undesired coverage of the image is avoided especially in the curved area. By then also achieving a certain distance range or a distance zone between the motor vehicle, in particular an outer side of the motor vehicle, and a position by an elongated distance marker, a distance of multiple positions on this elongated distance marker to the motor vehicle can advantageously also be recognized. In particular, it can then be recognized that multiple positions on this elongated distance marker all have the same or substantially the same real distance to the motor vehicle, in particular to a relevant outer side of the motor vehicle.

Preferably, this elongated distance marker extends parallel or substantially parallel to the motor vehicle, in particular parallel to an outer side of the motor vehicle. Thereby, the above mentioned advantages are again improved. Advantageously, the distance marker can be represented independently of specific objects, which are present and displayed in the image in the environmental region of the motor vehicle. Thus, it is not essentially required that a specific object is recognized in the environmental region and represented in the image and this distance marker is then specifically represented at or on the object and the distance of this object to the motor vehicle is then displayed. In particular, only a measure scale or mapping of this bowl shape of the image is to be effected by the virtual elongated distance marker, also independently of the specific object in the environmental region, to be able to obtain an improved sensation of positions and distances to the motor vehicle in this curved image representation.

It can be provided that the length of such an elongated distance marker is manually preset by a user. In particular, it can also be manually preset which distance to the motor vehicle is to be actually indicated by such a virtual distance marker. Thus, a user can for example perform an input, by which he presets the length of the distance marker and/or the distance from the motor vehicle to be represented by the elongated distance marker.

Multiple such virtual elongated distance markers can also be represented in the image. They can be arranged next to each other or in a row one behind the other. These distance markers can also at least partially extend parallel to each other.

However, similarly, it is also possible that such an elongated distance marker is automatically displayed on the image. Thus, the length of such a distance marker can also be automatically preset and displayed in this context. The distance of a position in the environmental region to the motor vehicle to be symbolically represented thereby can also be automatically selected. The automatic selection and representation can be effected depending on a parameter characterizing an operating state of the motor vehicle. In addition or instead, this automatic selection can be effected depending on the configuration of the environmental region. Thus, the number and/or the type and/or the position of objects in the environmental region can be taken into account in this context, to decide, where, how long and in which manner such an at least one virtual elongated distance marker is generated and represented depending thereon. For example, on environmental conditions, on which many such objects are in the environmental region of the motor vehicle and thus the motor vehicle is relatively closely and adjacent surrounded by multiple objects, such a selection and display of an elongated distance marker can be effected. For example, this can be the case in maneuvering through constrictions and/or in a parking operation.

In an advantageous implementation, at least one real dimension of the motor vehicle is preset as known and at least one position of an elongated distance marker in the image symbolizing a real distance in the image relative to the representation of the motor vehicle in the image is determined depending on this known dimension. This means that this elongated distance marker resorts to known and stored dimensions of partial components of the motor vehicle, in particular dimensions of the length and/or the width and/or the height, with regard to the correct distance display. Since these dimensions are known and also virtually invariable in this context, they always remain present as significant measures. In this context, the local smaller pictorial measure of this component can then be determined in the image and this measure can then be related to the real measure. Depending thereon, one virtually obtains a scale in this context, which dimension this component or which dimension the partial area of the motor vehicle has in the image and to which real dimension this measure then corresponds in the image. Depending thereon, a distance to the motor vehicle in this image can then again be determined, which then again corresponds to a real distance in the real environment or the real environmental region. Thereby, the elongated distance marker can be determined in very simple yet precise manner and be displayed in the image very accurate in location.

Advantageously, the real cameras are calibrated and at least one position of a distance marker in the image symbolizing a real distance in the image relative to the representation of the motor vehicle in the image is determined depending on the calibration. Such an alternative configuration also allows correctly representing the distance in the image in relatively simple yet precise manner and displaying the elongated distance marker so accurate in location in the image relative to the motor vehicle.

When calibrating a camera, the, especially mathematical, relationship between at least one real distance of a positon in the environment to the motor vehicle to the camera's world and therefore to the pixels respectively the positions of the pixels in the pixel field is created. The intrinsic and extrinsic, for example the lens distortion, the position of the camera and their rotation, of a calibrated camera are measured and are calculated with a physical model. A series of parameters is calculated after calibration. These parameters are stored in a memory. The parameters could be varied and adapted.

In an advantageous implementation, it is provided that the at least one position of a distance marker in the image symbolizing a real distance in the image relative to the representation of the motor vehicle in the image is determined only depending on the at least one dimension of the motor vehicle and only depending on the calibration of the cameras. This is a very advantageous implementation, which here very simply and fast allows a very accurate determination of this elongated distance marker. In this context, further information is not required. In particular, it is therefore no longer required to consider information of sensors at the motor vehicle actually determining a distance. In this context, it is for example therefore no longer required to use information of ultrasonic sensors of the motor vehicle to measure the distance in this respect and then display it in the image. Thereby, considerable computing effort is saved and the accuracy of the display is yet very high.

Preferably, the elongated distance marker is represented as a line. The line can be displayed as a solid line or as a dashed line or as a dot-dashed line or the like. The display can also change in this respect.

In an advantageous implementation, it is provided that the elongated distance marker is represented circumferentially closed, which means that the elongated distance marker is displayed as a closed frame or closed border around the motor vehicle. This is a very advantageous implementation, since it can thus be simply and fast recognized for an observer, even with a curved perspective representation of the environmental region in this respect, at which locations around the motor vehicle a same distance is present. Especially in perspectives of the virtual camera, which are not centrally displayed from the top and thus not as bird's eye perspectives, further uncertainties with respect to the distance estimation can occur for an observer in this respect. Especially then, in order to be able to recognize in these oblique perspectives, which are displayed as three-dimensional perspectives, also at all locations around the motor vehicle, where a zone or an area with circumferentially identical distance to the motor vehicle is present, this is a very advantageous implementation. Thus, with such a circumferential distance marker, a circumferential distance area or a distance zone is then also bounded between this distance marker and the motor vehicle.

In an advantageous implementation, it is thus provided that the elongated distance marker is generated as a line completely surrounding the motor vehicle.

In a further advantageous implementation, it is provided that at least two separate distance markers are displayed, which each symbolize an individual real distance. These distance markers can be represented different in color and/or structure. Thereby, they can be very simply and fast recognized and the distance respectively to be symbolized thereby can also be intuitively perceived. False interpretations by an observer can thereby be avoided.

In addition or instead, it can be provided that at least one distance marker has a dynamic display, for example can flash and/or can increase and decrease in its brightness and/or can change in its color configuration. This can in particular be effected if a limit distance is to be represented, in particular a limit distance, which is to represent a critical position situation of the motor vehicle to for example an object in the environmental region.

It can be provided that the at least two separate distance markers both are each displayed as circumferential lines of the motor vehicle in the image. Thereby, an interleaved arrangement of multiple identified distance zones, in particular completely extending around the motor vehicle, is virtually symbolized.

It can be provided that the at least one distance marker is represented as an overlay in the image.

In a further advantageous implementation, it can be provided that a position and/or a geometry of the distance marker in the image are co-changed depending on a change of the perspective of the virtual camera. Thereby, the representation of the distances then respectively newly arising and to be represented is allowed virtually in real time. Thus, the observer can immediately also recognize the change of the specific distance of a position in the environmental region to the motor vehicle with the change of the perspective.

It can be provided that the type of representation of a distance marker can be set by a user. This can relate to the color representation and/or the length and/or the width of such an elongated distance marker. However, it can also relate to other adjustment settings. In particular, there can also be input the point of time and/or in which environmental situations and/or in which driving situations a user desires such a displayed distance marker. Of course, these aspects can also be automatically effected in an alternative implementation. In addition, it can be provided that in automatic selection and display of a distance marker, the user is informed before display that such a display will be effected, wherein he can then also only start the actual display for example by actuation.

In a further advantageous implementation, it can be provided that in addition to the representation of the elongated distance marker symbolizing the distance, a value of a distance and thus a numerical value is represented on the image. Thereby, not only an elongated distance marker is represented as such, but the information is additionally displayed, which actual distance this distance marker represents. In addition or instead, it can also be provided that in addition to the representation of the elongated distance marker symbolizing the distance, an arrow is represented, which displays the section between the locations of the elongated distance marker and the motor vehicle, between which there is a distance. Thereby, the accuracy is again increased, since here the points are then substantially marked by the arrow, between which the corresponding distance is then actually present, virtually perpendicular to the outer side of the motor vehicle and perpendicular to the elongated distance marker, which is displayed extending parallel or substantially parallel to the outer side of the motor vehicle. The accuracy and the intuitive comprehension for the distance in the curved image, which occurs by the bowl shape representation, can thereby again be improved.

Preferably, it can be provided that the image is represented as a 2D top view to the motor vehicle and the environmental region. In a further advantageous implementation, it is provided that the image is represented as a 3D view.

It can be provided that the image is displayed on a touch-sensitive display unit.

Then, it can in particular be provided that the user can manually shift an already displayed elongated distance marker by touching the distance marker on the display unit, such that another distance is thereby individually symbolically displayed by the then newly positioned distance marker. Thereby, the user-individual setting is more variably and adequately possible.

Similarly, the value of a desired distance could be input, in particular by voice input of a user here too, and the associated elongated distance marker can be automatically displayed accurate in location in the image.

A further independent aspect of the invention relates to a method for representing an environmental region of a motor vehicle in an image. In the method, capturing real images of the environmental region is performed by a plurality of real cameras of the motor vehicle. The image is generated from these real images, which at least partially represents the environmental region. The image is represented from a perspective of a virtual camera arranged in the environmental region. At least one virtual, elongated distance marker is represented in the image, by which a distance to the motor vehicle is symbolized in the image. At least one real dimension of the motor vehicle is preset as known and at least one position of a distance marker in the image symbolizing a real distance in the image relative to the representation of the motor vehicle in the image is determined depending on this known dimension. In addition or instead, it can be provided that the real cameras are calibrated and at least one position of a distance marker in the image symbolizing a real distance in the image relative to the representation of the motor vehicle in the image is determined depending on this calibration or the calibration information.

Thereby too, the above mentioned advantages can be achieved. Implementations of the above mentioned first independent aspect relating to a method for representing an environmental region of a motor vehicle in an image are to be regarded as advantageous implementations of this further independent aspect.

An aspect of the invention relates to a computer program product, which is formed for executing a method according to the invention when the computer program product is executed on a programmable computer device.

An aspect of the invention relates to a display system with an evaluation unit, a display unit and at least one real camera, wherein the display system is adapted to perform a method according to the invention. The evaluation unit can for example be integrated in the real camera and/or in the display unit or be present as a separate unit.

An aspect of the invention relates to a motor vehicle, in particular a passenger car, includes a display system according to the invention or an advantageous implementation thereof.

The preferred embodiments presented with respect to the method and the advantages thereof correspondingly apply to the computer program product, to the display system as well as to the motor vehicle.

With the indications of "top", "bottom", "front", "rear", "horizontal", "vertical", "depth direction", "width direction", "height direction" etc., the positions and orientations given with intended use and intended arrangement of the virtual camera or the real camera or the motor vehicle are specified.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not comprise all of the features of an originally formulated independent claim. Moreover, implementations and feature combinations are to be considered as disclosed, in particular by the implementations set out above, which extend beyond or deviate from the feature combinations set out in the relations of the claims.

Below, embodiments of the invention are explained in more detail based on schematic drawings.

Figure 2:
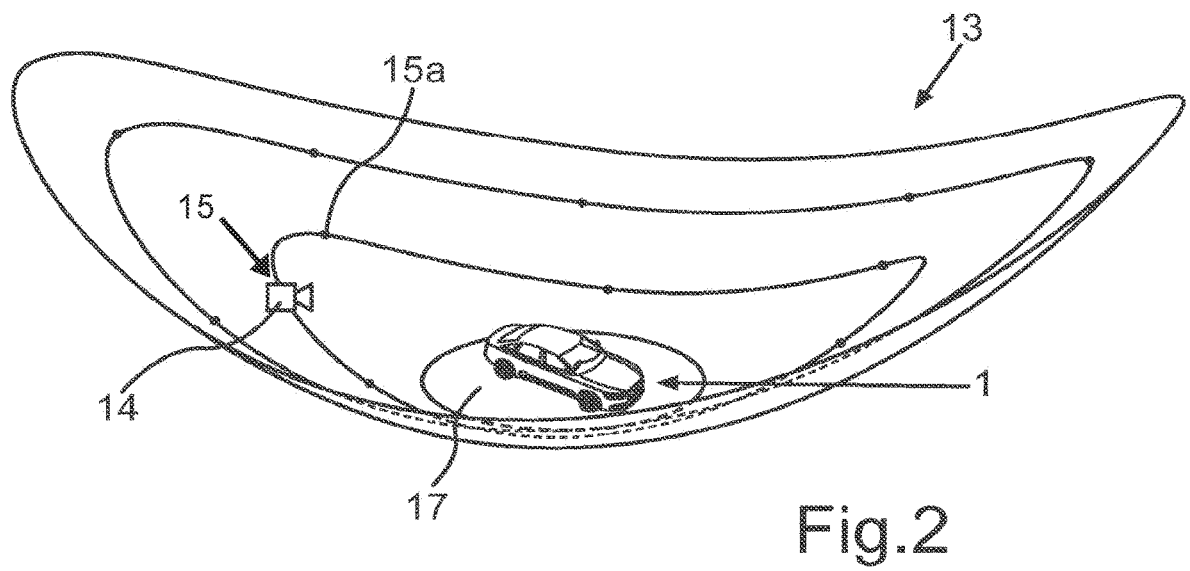
Figure 3:
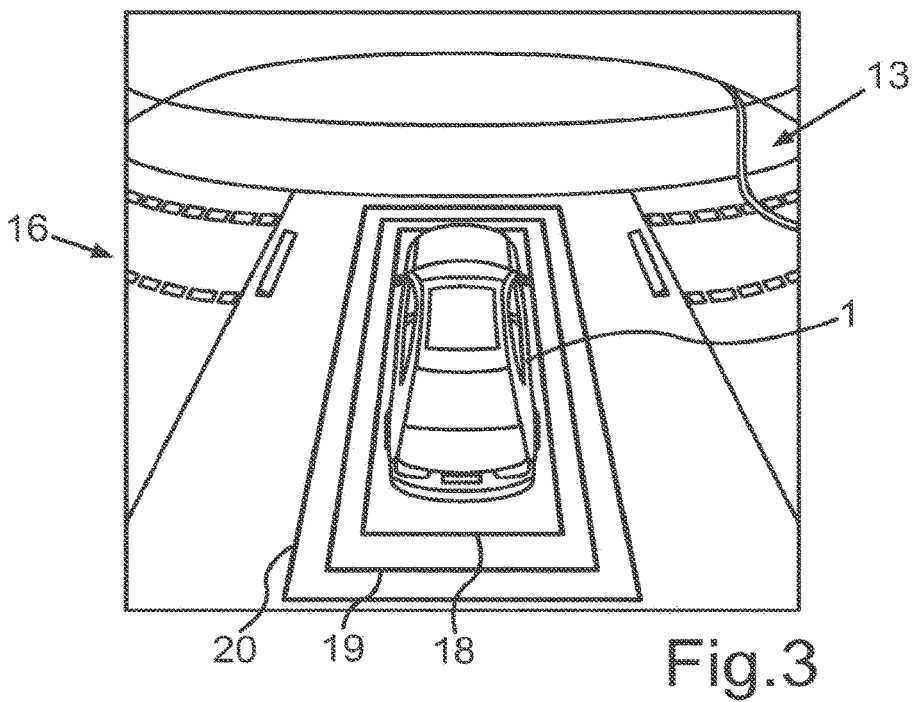
Figure 4:
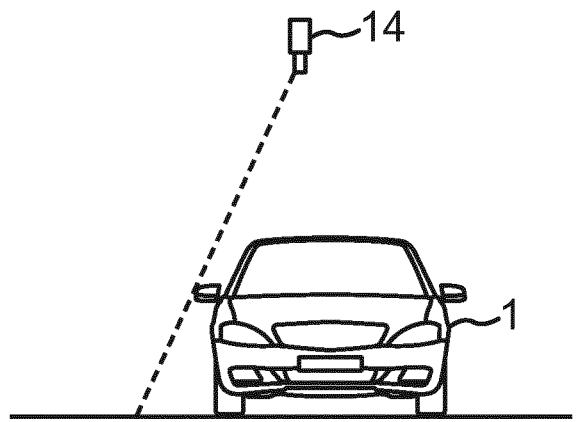
Figure 5:
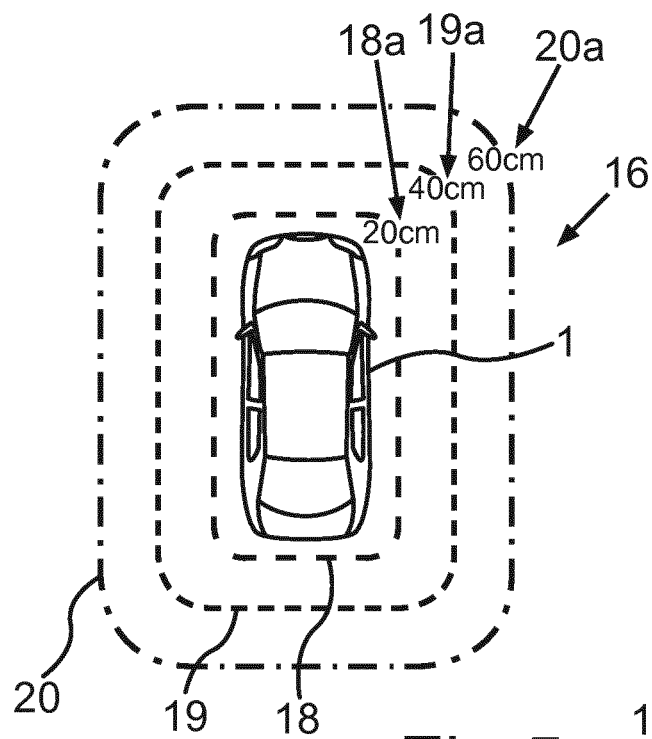
Figure 6:
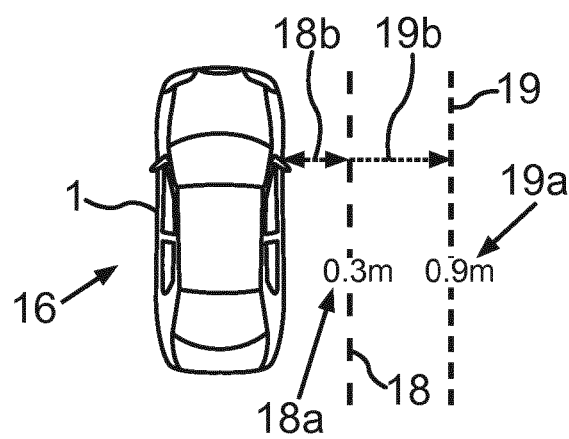

There show:

FIG. 1 a schematic top view to an embodiment of a motor vehicle with an embodiment of a display system;

FIG. 2 a schematic representation of a virtual arrangement of a virtual camera in an environmental region of the motor vehicle;

FIG. 3 a representation of an image of a bowl shape in a specific perspective of a virtual camera;

FIG. 4 a schematic representation, in which the virtual camera is directly disposed above the motor vehicle and the image is generated as a bird's eye perspective;

FIG. 5 a representation of an image as a bird's eye perspective as it is generated by the virtual camera according to the position in FIG. 4, wherein a plurality of elongated distance markers are represented in this image; and FIG. 6 a representation of a further embodiment of an image, in which multiple elongated distance markers are represented with additional numerical values for the symbolized distances and additional arrows.

In the figures, identical or functionally identical elements are provided with the same reference characters.

In FIG. 1, a top view to a motor vehicle 1 with a display system 2 according to an embodiment of the invention is schematically illustrated. In the embodiment, the display system 2 comprises an evaluation unit 3 and a display unit 4. Furthermore, the display system 2 comprises a first real camera 5, a second real camera 6, a third real camera 7 and a fourth real camera 8 in the embodiment. According to the embodiment, the first real camera 5 is disposed at a front 9 of the motor vehicle 1, the second real camera 6 is disposed on a right side 10 of the motor vehicle 1, the third real camera 7 is disposed at a rear 11 of the motor vehicle 1 and the fourth real camera 8 is disposed on a left side 12 of the motor vehicle 1. However, the arrangement of the real cameras 5, 6, 7, 8 is diversely possible, however, preferably such that the motor vehicle 1 and/or an environmental region 13 of the motor vehicle 1 can be at least partially captured.

In particular, the real cameras 5, 6, 7, 8 have a wide capturing range, which can for example be greater than 180°. The wide capturing range can each for example be provided by a fish eye lens of an objective of the real camera 5, 6, 7, 8. Thus, the display system 2 can for example be formed as an environmental vision system (CMS—camera monitoring system) or electronic rearview mirror or be formed as a further driver assistance system of the motor vehicle, in which the environmental region 13 is at least partially captured.

The real cameras 5, 6, 7, 8 can be CMOS (complementary metal-oxide semi-conductor) cameras or CCD (charge coupled device) cameras or also other image capturing devices, which can provide a frame of the environmental region 13 and/or the motor vehicle 1. The real cameras 5, 6, 7, 8 are in particular video cameras, which continuously provide an image sequence of frames. Then, the evaluation unit 3 processes the image sequence of the frames for example in real time. The evaluation unit 3 can for example be disposed within the respective real camera 5, 6, 7, 8 or within the display unit 4. However, the evaluation unit 3 can also be disposed outside of the respective camera 5, 6, 7, 8 or the display unit 4 in any other position within the motor vehicle 1 and thus be formed as a unit separate from the real camera 5, 6, 7, 8 and from the display unit 4.

For example, the display unit 4 can be formed as a liquid crystal display (LCD). The display unit 4 can be diversely disposed in the motor vehicle 1, however, preferably such that a user of the motor vehicle 1 can direct an unobstructed look to the display unit 4.

A plurality of real images is captured by the real cameras 5, 6, 7, 8. The real images show the environmental region 13 at least partially from the perspective of the respective real camera 5, 6, 7, 8. Preferably, the real images are captured at least partially overlapping.

FIG. 2 shows a virtual arrangement of a virtual camera 14 in the environmental region 13 of the motor vehicle 1. The virtual camera 14 can be diversely arranged in the environmental region 13. Preferably, the virtual camera 14 is arranged in preset virtual camera positions 15, in particular of the bowl shape of the image. Depending on the respective virtual camera position 15 of the virtual camera 14 and the orientation thereof, the perspective of the virtual camera 14 to the environmental region 13 and/or the motor vehicle 1 is determined. The perspective of the virtual camera 14 can for example be adapted in real time and within a predetermined computing time, respectively.

In FIG. 3, an image 16 is shown, as it can be represented on the display unit 4 of the motor vehicle 1. The image 16 is generated from a plurality of real images of the real cameras 5, 6, 7 and 8. In FIG. 3, the environmental region 13 is represented from a camera position 15a of the virtual camera 14. Therefore, the perspective is directed from the top and behind the motor vehicle 1 to the front. Here, the image 16 is in particular curved and thus represented in the bowl shape shown in FIG. 2, wherein the motor vehicle 1 is represented centrally in the bowl shape and on a bottom 17 of the bowl shape. In the image 16, a first virtual elongated distance marker 18 is represented. It symbolizes a real distance of positions in the environmental region 13 to the motor vehicle 1. Here, the distance marker 18 is represented as a line, in particular as a line completely closed extending around the motor vehicle 1. It thus symbolizes an identical distance or an at least substantially identical distance extending around the motor vehicle 1. Preferably, this elongated distance marker 18 is displayed as an overlay on the image 16. By this elongated distance marker 18, thus, a border or a boundary for a distance zone or a distance range is also formed, which arises around the motor vehicle 1 and completely circumferential. By this first distance marker 18, a consistent or substantially consistent distance to an outer side of the motor vehicle 1 is symbolically determined.

Here, a distance of 200 mm is in particular displayed by this first distance marker 18 in the embodiment. As is apparent in the representation in FIG. 3, the first distance marker 18 is also correspondingly drawn due to the individual perspective in this three-dimensional representation, which moreover also has this bowl shape and thus a curved representation. Thus, different virtual distances to the outer side of the motor vehicle 1 arise in the virtual image 16, although a circumferentially always identical distance to the motor vehicle 1 is virtually to be represented thereby in reality.

In the embodiment, it is provided that a second elongated distance marker 19 separate from the first distance marker 18 is represented as a virtual distance marker in the image 16 in FIG. 3. It symbolizes a second distance greater than the first distance, which is symbolically represented by the first distance marker 18. This second distance marker 19 is also formed as a line in the shown embodiment, which is here in particular represented and drawn completely circumferentially closed around the motor vehicle 1.

Moreover, it is preferably provided in the shown embodiment, that a third, further virtual and separate distance marker 20 is drawn in the image 16. It is again greater than the first distance markers 18 and 19 and thus surrounds the motor vehicle 1 in a relevant greater distance than the distance markers 18 and 19. By the further distance marker 20, which is also drawn line-like and preferably completely extending around the motor vehicle 1, a third distance is symbolized, which is here for example 600 mm. In particular, the real distance symbolically represented by the second distance marker 19 is 40 mm to the respective outer locations of the motor vehicle 1.

It can be provided that the distance markers are determined on the bottom of the environmental region with respect to the motor vehicle 1. However, a distance of a position in the environmental region 13 to the motor vehicle 1 can also be determined in a certain height spaced from the bottom of the environmental region 13.

In an advantageous implementation, it can be provided that it can be either manually selected by a user or automatically preset if the real distance to be displayed is to be determined and displayed in a position in the environmental region 13 on the bottom of the environmental region 13 to the motor vehicle 1 or is to be determined and displayed in a certain height.

By a virtual elongated distance marker 18, 19, 20, a real distance of a position in the environmental region 13 to the motor vehicle 1, in particular to an outer side of the motor vehicle 1, is symbolically indicated in this curved represented image 16.

In particular, at least one real dimension of the motor vehicle 1 is preset as known. Depending on this at least one known dimension, a position of a distance marker 18, 19, 20 in this image 16 symbolizing a real distance in the image 16 relative to the representation of the motor vehicle 1 in the image is determined. This means that the known real dimension is used and the measure of this real dimension is determined in the image 16. Depending on this measure in the image 16, a real distance in the environmental region 13 is then converted or scaled to this fictive virtual distance in the image 16. This means that a distance representation for example from the first distance marker 18 to the one outer side of the motor vehicle 1 is scaled to the dimension of the motor vehicle 1 in this image. The determination of this position of the distance marker 18 in the image 16 is therefore advantageously effected exclusively by taking real dimensions of the motor vehicle 1 as a basis, which are then used for conversion in the image 16, and/or the determination of this position of the distance marker 18 in the image 16 is advantageously effected exclusively depending on a calibration of the real cameras 5, 6, 7, 8 and thus based on this calibrated information. Preferably only at least one of the two possibilities, but maximally both of these possibilities, are preferably used to determine and calculate, respectively, the position of the distance marker in the image 16 relative to the motor vehicle 1.

Further information, which could for example be obtained by distance determining sensors at the motor vehicle 1, is not used. Thus, information of ultrasonic sensors or radar sensors or lidar sensors is in particular not taken into account. Thereby, the determination of this representation of the virtual distanced marker 18, 19, 20 in the image 16 is very simply yet very accurately allowed.

It is to be again mentioned that the perspective of the virtual camera 14 illustrated in FIG. 3 is only to be exemplarily understood and very diverse other camera positions 15, 15a and thus very diverse other perspectives are allowed. Depending thereon, differently perspectively shown representations and positions of at least one distance marker 18, 19, 20 then again result.

In FIG. 4, a position of the virtual camera 14 is shown in a very simplified representation, in which a bird's eye perspective is here generated. In this implementation, an image 16 is then generated as it is exemplarily shown in FIG. 5. Here too, exemplary distance markers 18, 19 and 20 are again illustrated. In contrast to FIG. 3, here, the distance markers are also again line-like configured, which are preferably drawn completely extending around the motor vehicle 1. Here, they are exemplarily not shown as solid lines, but as dotted or dot-dashed lines or dashed lines. Moreover, here, in an advantageous implementation, which can also be realized in FIG. 3, it is provided that a specific numerical value 18a, 19a and 20a is also displayed on the image 16 in addition to a line, which indicates the specific distance value. The measuring unit is preferably also displayed.

In addition or instead, the distance markers 18, 19 and 20 can also have different colors, such that they can also be differentiated in this respect. They can be statically displayed, but can also be dynamically displayed. Thereto, they can optionally flash and/or change the color and/or change the brightness of the color representation.

In FIG. 6, an image 16 is shown in a further embodiment, which is preferably represented as a bird's eye perspective in a bowl shape. In contrast to FIG. 5, it is here provided that an elongated distance marker 18 is represented only partially extending around the motor vehicle 1. Here, it is represented only parallel or substantially parallel to a right-side outer side of the motor vehicle 1 and thus to the passenger side. Here, a specific numerical value 18a with a specific measuring unit is also additionally again displayed on the image 16. Here, an arrow 18b is moreover also displayed in an advantageous implementation, which extends between the other side of the motor vehicle 1 and the distance marker 18. Thus, specific locations are here displayed, between which this real distance, which is symbolically represented in the image 16, is to be understood. The same is also provided with the further distance marker 19, wherein a specific numerical value 19*a* and an arrow 19*b* are here also preferably additionally displayed. The representations in FIG. 5 and FIG. 6 can also be represented in a three-dimensional view, as it is correspondingly shown in FIG. 3. Here too, very diverse virtual camera positions 15, 15*a* can then be provided, in which this virtual camera 14 can be positioned. The representation of a distance marker 18, 19 and 20 can change depending on a change of the perspective of the virtual camera 14 and/or depending on a change of the environmental region 13 and/or depending on a change of the operating state of the motor vehicle 1, in particular also in dynamic manner. The display of specific numerical values 18*a*, 19*a*, 20*a* and/or of arrows 18*b*, 19*b* can also be effected depending on these mentioned parameters and/or influencing factors, in particular also effected displayed in dynamic manner.

In particular by a manual input, in particular via an operating unit of the display system 2, the number and/or the type of a distance marker 18, 19, 20 can in particular be manually set by a user. In this context, it can also be user-individually set if the numerical values 18*a*, 19*a*, 20*a* and/or the arrows 18*b* and/or 19*b* are also virtually displayed.

For determining the distance marker, in particular with regard to the scaled position in the image 16 in relation to the representation of the real distance to the motor vehicle 1, information characterizing the operating state of the motor vehicle 1 such as for example the vehicle speed and/or a steering angle either is not required in advantageous implementation.

What is claimed is:

1. A method for representing at least a portion of an environmental region of a motor vehicle in an image, in which real images of the environmental region are captured by a plurality of real cameras of the motor vehicle and the image is generated from these real images, the image representing at least a portion of the environmental region, wherein the image is represented from a perspective of a virtual camera arranged in the environmental region, and the image is generated as a virtual bowl shape,
    wherein at least one virtual elongated distance marker is represented in the image, by which a real distance to the motor vehicle is symbolized in the virtual bowl shape,
    wherein at least one real dimension of the motor vehicle is preset as a known dimension stored as a measure of the real dimension and at least one position of the distance marker in the image corresponds to the real distance relative to the representation of the motor vehicle in the image and is determined based on the known dimension by converting the real distance in the environmental region to the at least one position in the virtual bowl shape of the image based on the measure of the real dimension, and
    wherein the plurality of real cameras includes at least one camera disposed at each of a front, right side, rear, and left side of the vehicle, and
    wherein the real cameras are calibrated by measuring lens distortion, position, and/or rotation with a physical model and calculating parameters, and the at least one position of the distance marker in the image symbolizing the real distance relative to the representation of the motor vehicle in the image is determined based on the parameters.

2. The method according to claim 1, wherein the at least one position of the distance marker in the image symbolizing the real distance in the image relative to the representation of the motor vehicle in the image is determined only based on a combination of (i) the at least one dimension of the motor vehicle and (ii) the calibration.

3. The method according to claim 1,
    wherein the distance marker is generated as a line in the image, at least a portion of the line represented as extending at least substantially parallel to at least a portion of an outer side of the motor vehicle in the image.

4. The method according to claim 3, wherein
    the distance marker is generated as a line completely surrounding the motor vehicle.

5. The method according to claim 1, wherein at least two separate distance markers, which each symbolize an individual distance, are represented in the image, wherein the distance markers are represented differently in color and/or structure.

6. The method according to claim 1, wherein the at least one distance marker is represented as an overlay in the image.

7. The method according to claim 1, wherein a position and a geometry of the distance marker in the image are co-changed based on a change of the perspective of the virtual camera.

8. The method according to claim 1, wherein the type of the representation of the distance marker can be set by a user.

9. The method according to claim 1, wherein in addition to the representation of the elongated distance marker symbolizing the real distance, a value of the real distance is represented in the image.

10. The method according to claim 1, wherein the image is represented as a two-dimensional (2D) top view of the motor vehicle and the environmental region.

11. The method according to claim 1, wherein the image is represented as a three-dimensional (3D) view.

12. The method according to claim 1, wherein a position and/or a geometry of the distance marker in the image is changed based on a change of the perspective of the virtual camera.

13. The method according to claim 1, further comprising representing in the image at least one arrow between a location on the elongated distance marker and a location on the motor vehicle, the arrow being perpendicular to the elongate distance marker.

14. The method according to claim 1, wherein
    the real cameras are further calibrated by creating a mathematical relationship between a distance to at least one position in the environmental region and pixels in a pixel field.

15. A programmable computer device comprising a computer program product executable on the programmable computer device in order to capture real images of an environmental region by a plurality of real cameras mounted to a motor vehicle and generate an image from the real images, the image representing at least a portion of the environmental region, wherein the image is represented from a perspective of a virtual camera arranged in the environmental region, and wherein the image is generated as a bowl shape, wherein at least one virtual elongated distance marker is represented in the image, by which a real distance to the motor vehicle is symbolized in the virtual bowl shape, wherein at least one real dimension of the motor vehicle is preset as a known dimension stored as a measure of the real dimension and at least one position of the distance marker in the image corresponds to the real distance relative to the representation of the motor vehicle in the image and is determined depending on the known dimension by converting the real distance in the environmental region to the at least one position in the virtual bowl shape of the image based on the measure of the real dimension, and wherein the plurality of real cameras includes at least one camera disposed at each of a front, right side, rear, and left side of the vehicle, and wherein the real cameras are calibrated by measuring lens distortion, position, and/or rotation with a physical model and calculating parameters, and the at least one position of the distance marker in the image symbolizing the real distance relative to the representation of the motor vehicle in the image is determined based on the parameters.

16. The programmable computer device of claim 15, wherein the real cameras are further calibrated by creating a mathematical relationship between a distance to at least one position in the environmental region and pixels in a pixel field.

17. A display system for a motor vehicle, the display system comprising a programmable computer device, a display, and a plurality of real cameras, the display system configured to execute a method for representing at least a portion of an environmental region of a motor vehicle in an image, the method comprising capturing real images of the environmental region using a plurality of real cameras of the motor vehicle and generating the image from the real images, the image representing the at least portion of the environmental region, wherein the image comprises a bowl shape and is represented from a perspective of a virtual camera arranged in the environmental region, wherein the image comprises at least one virtual elongated distance marker representing a real distance to the motor vehicle in the virtual bowl shape, wherein at least one real dimension of the motor vehicle is preset as a known dimension stored as a measure of the real dimension and at least one position of the distance marker in the image corresponds to the real distance relative to the representation of the motor vehicle in the image and is determined depending on the known dimension by converting the real distance in the environmental region to the at least one position in the virtual bowl shape of the image based on the measure of the real dimension, and wherein the plurality of real cameras includes at least one camera disposed at each of a front, right side, rear, and left side of the vehicle, and wherein the real cameras are calibrated by measuring lens distortion, position, and/or rotation with a physical model and calculating parameters, and the at least one position of the distance marker in the image symbolizing the real distance relative to the representation of the motor vehicle in the image is determined based on the parameters.

* * * * *